United States Patent [19]
Mason

[11] Patent Number: 5,841,373
[45] Date of Patent: Nov. 24, 1998

[54] SIMPLIFIED ALPHABETIC COMMUNICATOR FOR HANDICAPPED OR INFIRMED PERSONS

[76] Inventor: Donny L. Mason, 4924 Morro Blvd., Portsmouth, Va. 23701

[21] Appl. No.: 270,693

[22] Filed: Jul. 5, 1994

[51] Int. Cl.⁶ .................................................. H03K 17/94
[52] U.S. Cl. .............................. 341/21; 341/22; 345/157; 248/442.2
[58] Field of Search ................................. 341/21, 20, 22; 340/825.19, 286.07; 345/156, 157, 169, 172, 160, 184; 248/447, 445, 442.2; 601/23, 24

[56] References Cited

U.S. PATENT DOCUMENTS

| | | | |
|---|---|---|---|
| 3,651,512 | 3/1972 | Summers | 340/325 |
| 3,781,802 | 12/1973 | Kafafian | 340/147 R |
| 3,925,779 | 12/1975 | Gerstenhaber | 340/337 |
| 4,241,521 | 12/1980 | Dufresne | 434/112 |
| 4,333,092 | 6/1982 | Field | 340/378.2 |
| 4,458,238 | 7/1984 | Learn | 340/825.19 |
| 4,758,829 | 7/1988 | Smith, IV | 340/825.19 |
| 4,761,633 | 8/1988 | Leff et al. | 340/286.07 |
| 4,891,630 | 1/1990 | Friedman et al. | 340/825.19 |
| 5,271,593 | 12/1993 | Kinner et al. | 248/447 |

*Primary Examiner*—John K. Peng
*Assistant Examiner*—Daniel J. Wu
*Attorney, Agent, or Firm*—David L. Baker; Henry S. Miller; Rhodes & Ascoullo

[57] ABSTRACT

A silent communicator for persons who are incapable of communicating their needs. The communicator is comprised of a display panel mounted on an arm which is in turn mounted on a bed rail or other surface accessible to the patient, and a control pad which fits in the patient's hand. The control pad has a rocker switch and two button switches for the patient to manipulate to display a message on the display panel.

2 Claims, 4 Drawing Sheets

SIMPLIFIED ALPHABETIC COMMUNICATOR FOR HANDICAPPED OR INFIRMED PERSONS

BACKGROUND OF THE INVENTION

1. Field of the Invention

The invention relates generally to communicators and in particular to silent communicators that may be controlled and used by the handicapped or infirmed.

2. Description of the Prior Art

One of the most important skills we have been taught, almost from birth and continue to learn all of our lives, is communication. When we are unable to communicate, it leaves others who want or need to know information about us with a difficult task. Those who go through life unable to hear or speak learn to communicate by using their hands. This limits their ability to communicate with the majority because the majority do not learn sign language. There are people who must learn an alternative way to temporarily communicate, usually because of illness. There are several devices available for the different individual needs. The devices run from sophisticated and complex to a more simplified design. What must be considered is what other limitations the individual may have. For example, if the individual is blind and cannot speak, a device incorporating the use of braille is needed. A small child can use a device incorporating pictures. Another group of people who need a simplistic but effective means to communicate their basic needs are those with illnesses which prevent them from speaking because of intubation or paralysis.

Some examples of prior art communicators include U.S. Pat. No. 3,651,512 issued Mar. 21, 1972 to Summers, this communicator is a box with translucent windows having a preprinted message or words in each panel that is illuminated by a small lamp located behind a translucent material in each panel. The lamps light as the user depresses a button on a hand control unit. U.S. Pat. No. 3,781,802 issued Dec. 25, 1973 to Kafafian who discloses another panel with letters, numbers and symbols that are printed on a translucent material with lights behind each letter or symbol. The device includes three different key interfaces. U.S. Pat. No. 3,925,779 issued Dec. 9, 1975 to Gerstenhaber shows a hand held message device that uses a keyboard panel with coded messages, the messages may be changed by conveniently changing the printed circuit. FIG. 5 of U.S. Pat. No. 4,241,521 issued Dec. 30, 1980 to Dufresne includes a translucent panel containing letters and symbols illuminated by small lights behind each one. Four buttons control the position of the light. The device includes a memory in order that recorded information may be played back. The patented device also includes a removable window for the translucent panel so that messages or symbols may be changed as desired. The final U.S. Patent of which Applicant is aware is U.S. Pat. No. 4,333,092 issued Jun. 1, 1982 to Field. This device is similar to other well known devices and it consists of a large box containing a plurality of small boxes with individual lights and a translucent panel with signs or characters that light upon command from a control box containing a switch for each individual light. It is not seen where any of the cited prior art anticipates the invention disclosed herein.

SUMMARY OF THE INVENTION

The invention is directed to a simple, small and light weight communicator where the infirmed or handicapped individual needs only one hand to communicate a message. In the operating mode a panel displays the alphabet in two rows at the bottom of a display screen. The top of the screen is empty with two rows reserved for the message to be spelled out. In addition, the screen contains a boxed letter "D" which will delete the entire message and clear the two message lines and a boxed minus symbol which will provide a space between the letters as needed. The system is operated by a control pad, wired to the display panel and containing a button to cancel the last letter, a four way rocker switch that will move a curser on the screen, left/right and up/down and a select switch which will cause the letter identified by the cursor to appear in sequence on the message line of the display screen. A communication message is formed by the user holding the control pad in his hand and by working the four way switch with his thumb moves the cursor across the display panel to the desired letter for the message. The user presses the select button and the letter appears as the next sequential letter on the message line. In the event the letter is incorrect or the user simply changes his mind he can depress the cancel button and the letter only is deleted from the message line. The user repeats the process until he has completed his message where it is in view for all purposes.

It is therefore an object of the invention to provide a new and improved simplified alphabetic communicator for handicapped or infirmed persons that is small and light in weight.

It is another object of the invention to provide a new and improved communicator for handicapped or infirmed persons that is simple to use.

It is a further object of the invention to provide a new and improved communicator for handicapped or infirmed persons that is low in cost.

It is still another object of the invention to provide a new and improved communicator for handicapped or infirmed persons which has all of the advantages of prior art communicators and none of the disadvantages.

It is still a further object of the invention to provide a new and improved communicator for handicapped or infirmed persons which may be easily and efficiently manufactured and marketed.

These and other advantages, features and objects of the invention will become more apparent from the following description taken in connection with the illustrative embodiment in the accompanying drawings.

DETAILED DESCRIPTION OF THE INVENTION

Figure 1:
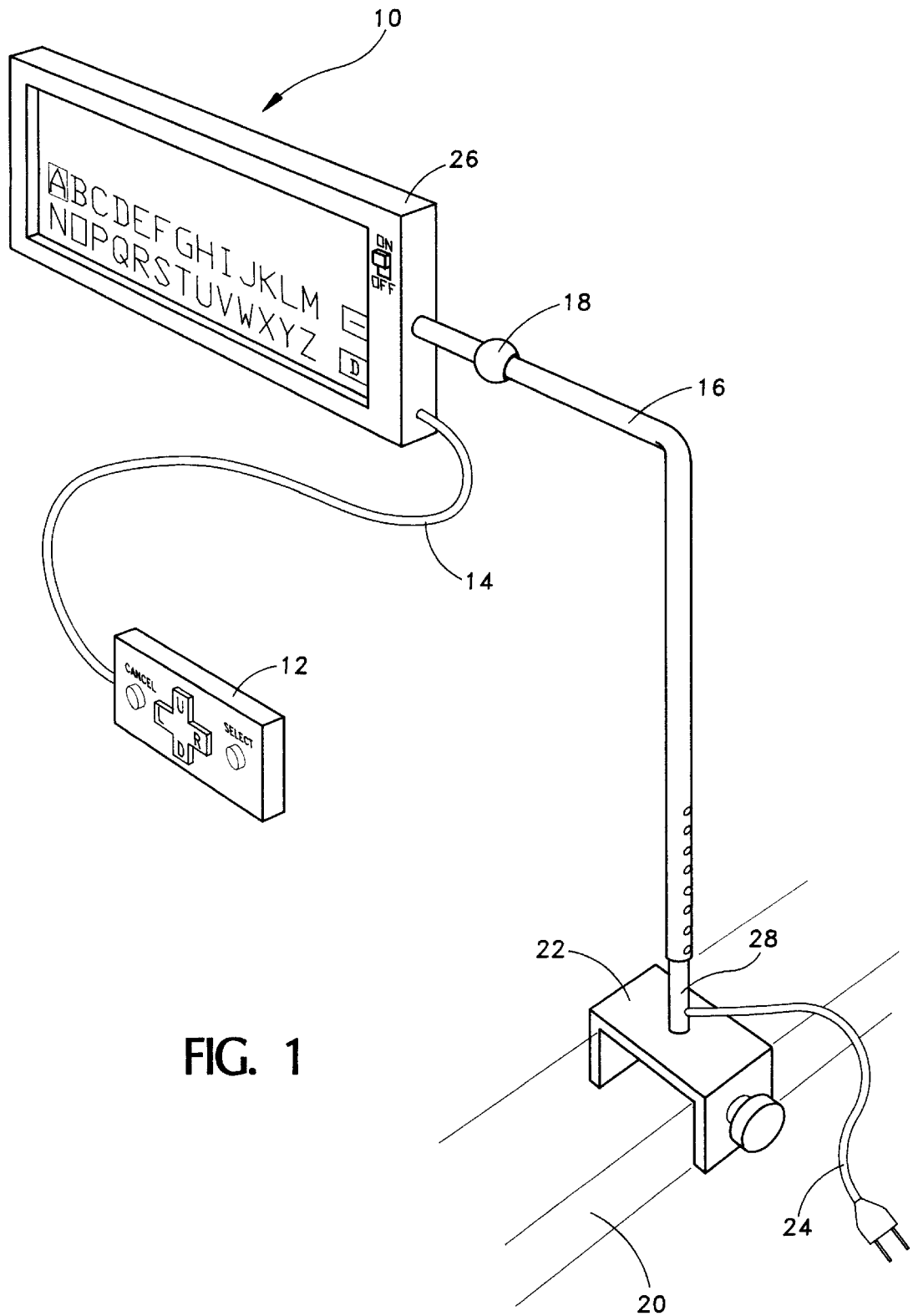
FIG. 1 is a perspective view of the invention.

Referring now to FIG. 1 there is shown a display generally at 10 with a control pad 12 connected by wire 14. Support arm 16 containing universal ball and socket joint 18, is adjustably connected to a base means 20 by clamp 22. The base means could be a bed rail, for example. This arrangement will allow the display panel to tilt and the height to be adjusted for the convenience of the user. Optional handles may be provided to allow the display to be moved without actually touching the display screen. Power cord and plug 24 travel from the display panel circuitry not shown except for the E-prom chip or computer 23 contained within the display unit container 26 through arm 16 and exit through support arm extension 28.

Figure 2:
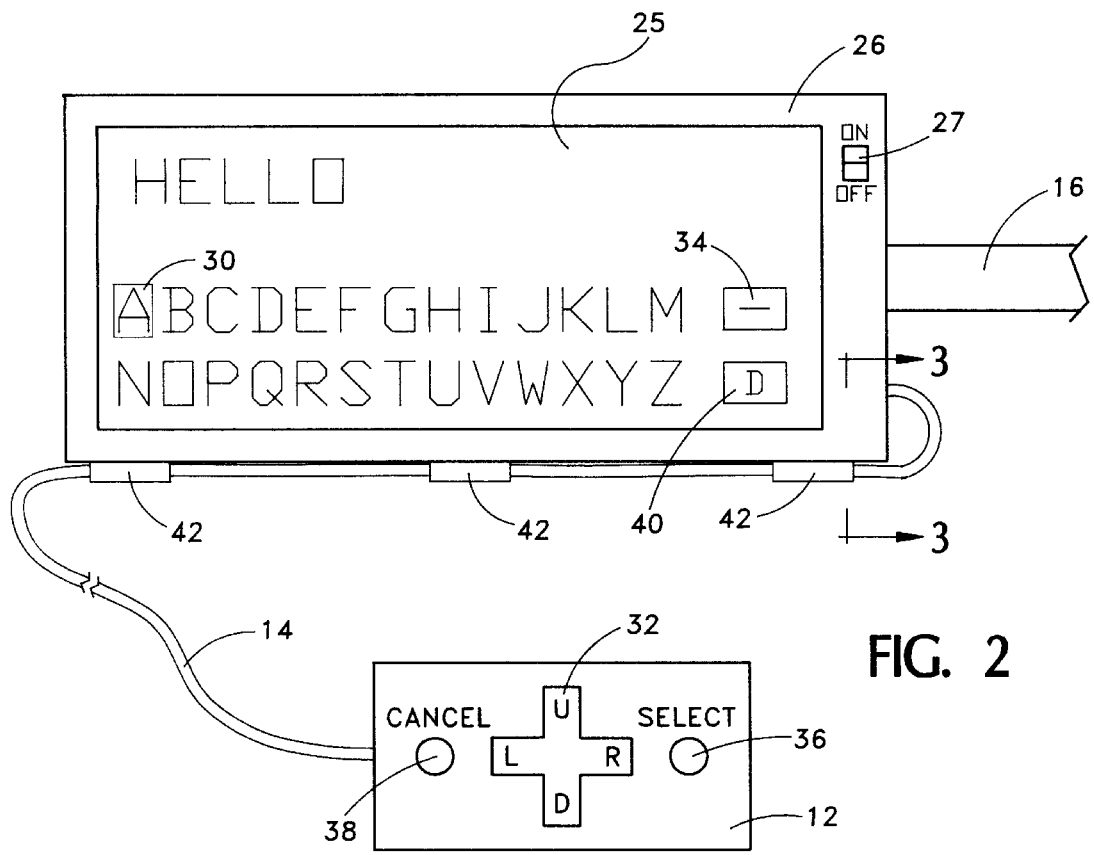
FIG. 2 is a plan view of the display panel and the control pad of the invention.

Concerning FIG. 2, arm 16 is shown entering display unit container 26. Power switch 27 is mounted of the face of the container 26. The liquid crystal display panel 25 continually shows letters A to Z with a box cursor 30 position controlled by four way rocker switch 32. Minus symbol 34 will proved a single space when identified by the cursor and activated by the select switch button 36. A last character cancel switch button 38 allows the user to delete the last single character that appeared on the message screen. The "D" character 40 on the screen, when activated removes the entire message from the screen. The letters appear on the screen in sequential order as for example in the word "HELLO" the letters identified by the cursor sequentially would be H, then E, then L and L and O. The letters do not have to be moved into position and cannot be manipulated after they appear on the message line. The system provides for two lines of message where each letter is an minimum of font 14 point size.

Figure 3:
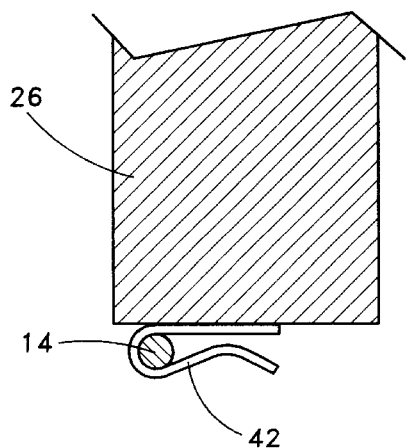
FIG. 3 is a cross sectional view of the wire with securing means taken along line 3—3 in FIG. 2

Wire 14 exits the container 26 from the right side as viewed by the user, this is for the convenience of the user who would normally be right handed, thus allowing the connector wire 14 to be located along the side rail of the bed and not interfere with the bedding and any other tubes and wires that may be in the bed. Provision is made for the individual user who would be using his left hand; the wire 14 is supported by clips 42 mounted under container 26 and comes off the left side of the container as shown. The clip is also shown in FIG. 3 with wire 14 rolled into place.

Figure 4:
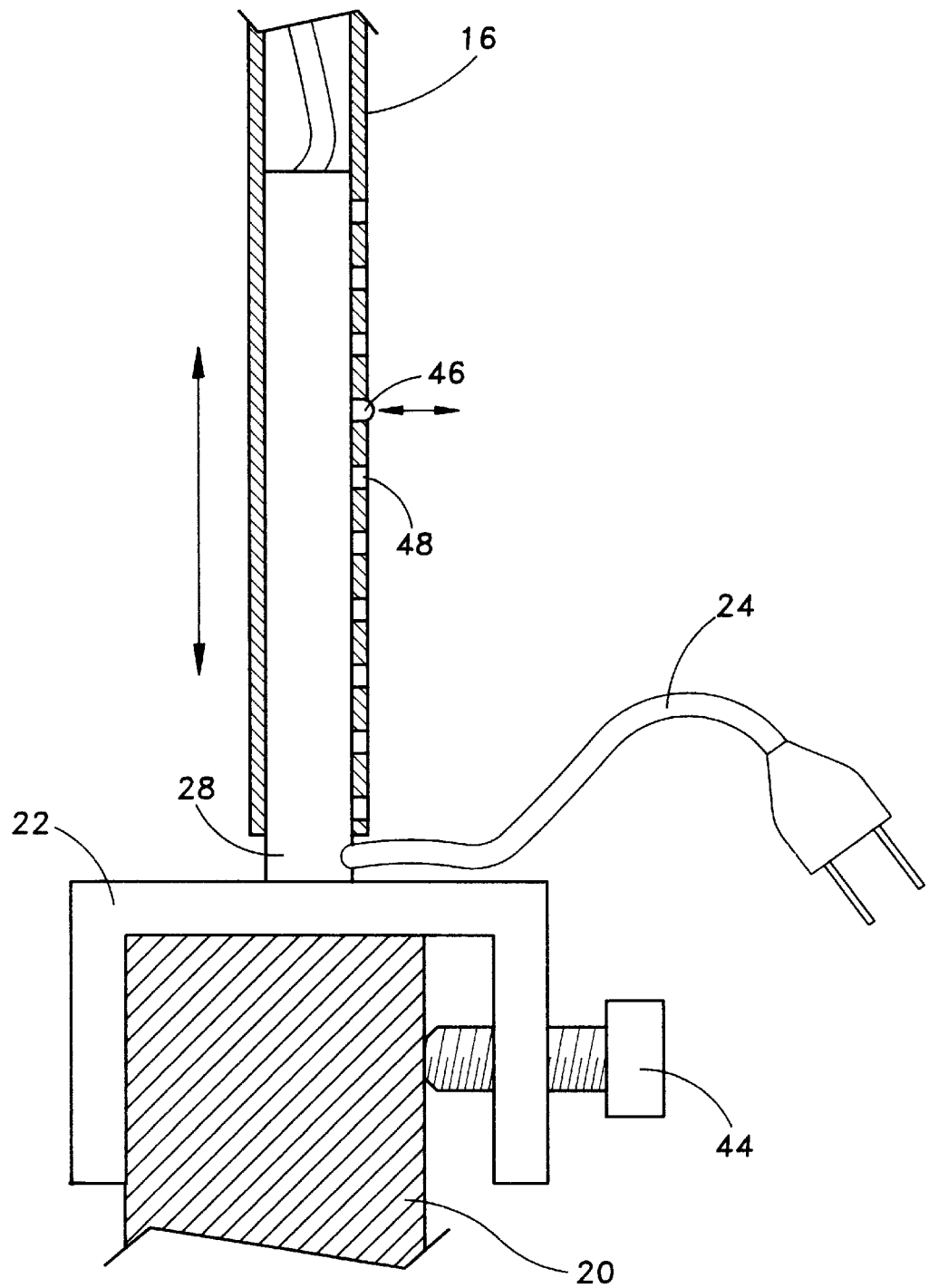
FIG. 4 is a view, partly in cross section of the arm clamping means of the invention.

FIG. 4 illustrates the clamp 22 in locked condition over base member 20. It is desirable for the clamp to have a range of up to three inches which will engage most bed rails and still not have the securing bolt 44 extending beyond the structure an unacceptable amount. Support arm extender 28 includes a spring biased ball 46 engages a series of apertures 48 on the arm 16 and provides for height adjustment of the display panel 10.

Figure 5:
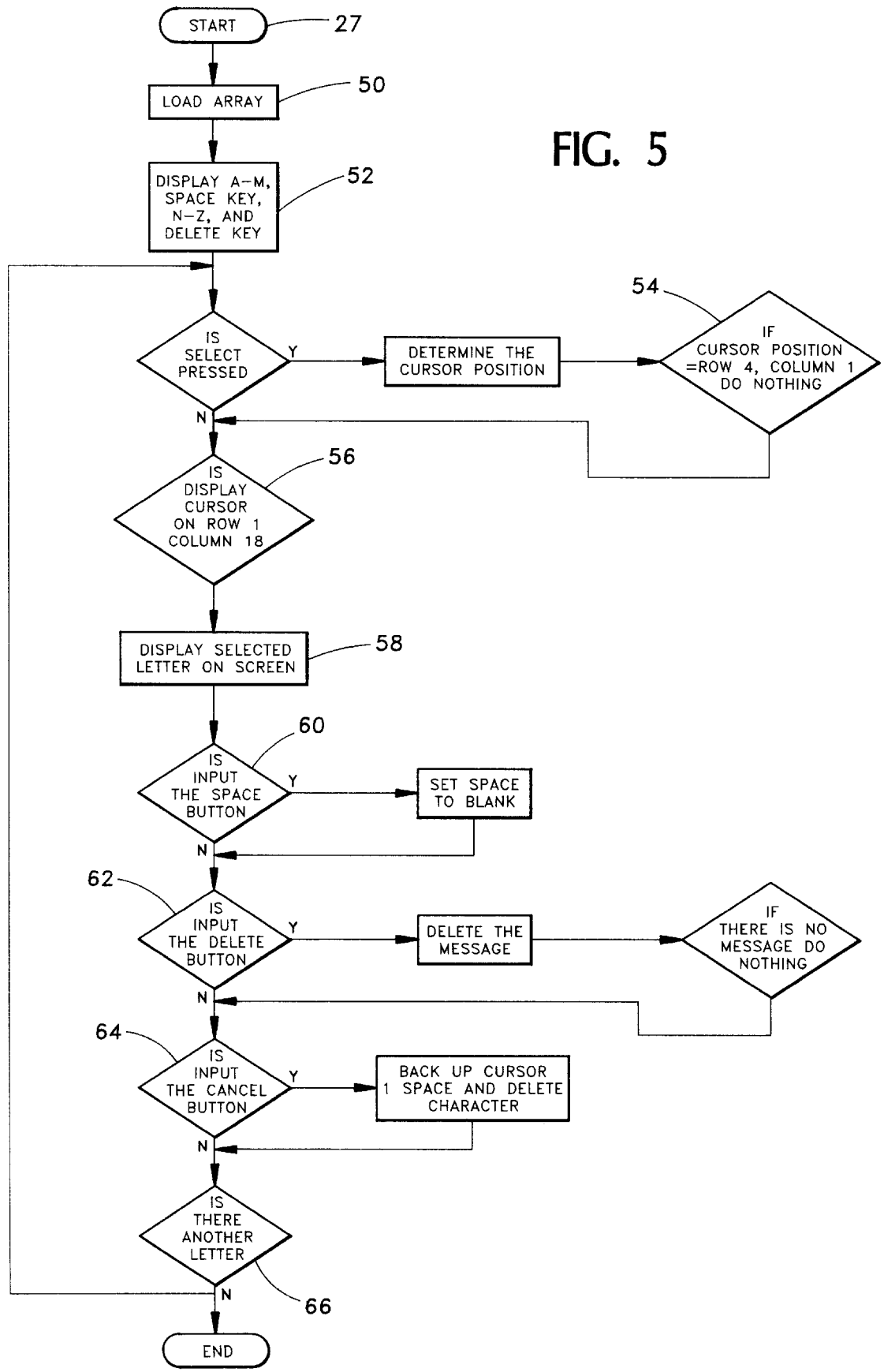
FIG. 5 is a flow chart of the system of the invention.

FIG. 5 is a flowchart of the program used in the otherwise conventional electronics of the invention. The program is straight forward and can be programmed and burned into an E-prom chip or it can be programmed into a computer and mounted inside the display panel container 26. The E-prom will utilize a minimum of space inside the display panel and is therefore the most desirable. The program will read the input from the control pad 12 and act on it.

When the system is powered up by turning switch 27 to the ON position an array 50 consisting of (26) letters of the alphabet, (6) rows, and (16) columns is initialized. The program will display the alphabet in upper case, A–M and the SPACE key on line four and N–Z and the DELETE key on line five 52. The cursor 30 will be placed in the first column, fourth row 54. Each time the SELECT button 36 is depressed the following processing will take place, the cursor position will be identified. If the cursor is on row (4), column (16) the cursor will be moved to row (5) column(1) 56. The letter selected will then be displayed on the display screen 58. If the cursor is over the SPACE key 34 when the select button 36 is depressed the display row and column will be set to zero 60 which is the equivalent to a blank. If the cursor is over the DELETE key 40 and the select button 36 is depressed all the letters in rows one and two of the display area will be deleted 62. If the CANCEL button 38 on control pad 12 is depressed, the cursor will be backed up (1) column and the character in the space will be deleted 64. The user may then select another letter 66 and the program will repeat until the user has completed the message.

It should be understood, of course, that the foregoing disclosure relates to only a preferred embodiment of the invention and that numerous modifications or alteration may be made therein without departing from the spirit and scope of the invention as set forth in the appended claims.

What is claimed is:

1. A simplified alphabetic message communicator for handicapped or infirmed persons comprising:

an enclosure housing having a substantially rectangular shape;

a liquid crystal display screen forming at least part of one wall of said enclosure;

a programmable computer means, comprising an E-prom chip, mounted within the enclosure for controlling the display means;

means remote form the enclosure, connected to the computer means for providing and controlling input by said handicapped or infirmed persons, comprises:

a user held control pad;

a plurality of switches;

one of said switches controls a display cursor;

another one of said switches controls the selection of a display letter; and another one of said switches cancels a display letter; arm means, for supporting the enclosure housing, comprising a ball joint allowing for adjustment in three dimensions of the display means; and a clamp means forming one end of the arm means for securing the arm to a selected base structure.

2. A simplified alphabetic message communicator for handicapped or infirmed persons comprising:

an enclosure housing having a substantially rectangular shape;

a liquid crystal display screen forming at least part of one wall of said enclosure;

a programmable computer means, comprising an E-prom chip, mounted within the enclosure for controlling the display means;

means remote from the enclosure, connected to the computer means for providing and controlling input by said handicapped or infirmed persons, comprises:

a user held control pad;

a plurality of switches;

one of said switches controls a display cursor;

another one of said switches controls the selection of a display letter; and another one of said switches cancels a display letter; arm means, for supporting the enclosure housing, comprising a ball joint allowing for adjustment in three dimensions of the display means;

a clamp means forming one end of the arm means for securing the arm to a selected base structure; and means for adjusting the height of the display panel comprising a spring biased ball engaging one of a plurality of apertures on the arm.

* * * * *